(12) United States Patent
Takinoiri

(10) Patent No.: US 9,967,452 B2
(45) Date of Patent: May 8, 2018

(54) IMAGING APPARATUS AND IMAGING METHOD FOR CONTROLLING AUTO-FOCUS

(71) Applicant: Olympus Corporation, Hachioji-shi (JP)

(72) Inventor: Satoshi Takinoiri, Yokohama (JP)

(73) Assignee: Olympus Corporation, Tokyo (JP)

( * ) Notice: Subject to any disclaimer, the term of this patent is extended or adjusted under 35 U.S.C. 154(b) by 8 days.

(21) Appl. No.: 15/184,178

(22) Filed: Jun. 16, 2016

(65) Prior Publication Data

US 2016/0381280 A1 Dec. 29, 2016

(30) Foreign Application Priority Data

Jun. 25, 2015 (JP) ................. 2015-127454

(51) Int. Cl.
*H04N 5/232* (2006.01)
*H04N 5/345* (2011.01)
*H04N 5/369* (2011.01)

(52) U.S. Cl.
CPC ....... *H04N 5/23212* (2013.01); *H04N 5/3456* (2013.01); *H04N 5/3696* (2013.01)

(58) Field of Classification Search
CPC . H04N 5/23212; H04N 5/3456; H04N 5/3696
See application file for complete search history.

(56) References Cited

U.S. PATENT DOCUMENTS

| 7,058,294 | B2* | 6/2006 | Nakahara | G02B 7/285 348/345 |
|---|---|---|---|---|
| 8,964,061 | B2 | 2/2015 | Hirose | |
| 9,094,602 | B2* | 7/2015 | Kunugi | H04N 5/23212 |
| 2004/0202461 | A1* | 10/2004 | Nakahara | G02B 7/285 396/104 |
| 2011/0199506 | A1* | 8/2011 | Takamiya | G02B 7/34 348/222.1 |
| 2014/0198245 | A1* | 7/2014 | Kunugi | H04N 5/23212 348/349 |

* cited by examiner

*Primary Examiner* — Nicholas Giles
(74) *Attorney, Agent, or Firm* — John C. Pokotylo; Pokotylo Patent Services

(57) ABSTRACT

An imaging apparatus, comprising a focus detection section that detects an out of focus amount and an out of focus direction by carrying out a focus detection operation using phase difference detection based on a pixel signal of focus detection pixels that has been thinned and read out, a swirl error determination section that determines swirl error arising in accordance with inclination of an optical image with respect to a direction that is orthogonal to a phase difference detection direction, based on the pixel signal of the focus detection pixels that has been thinned and read out, and an AF control section that determines whether or not to carry out AF operation adopting output of the focus detection section, based on output of the swirl error determination section.

20 Claims, 8 Drawing Sheets

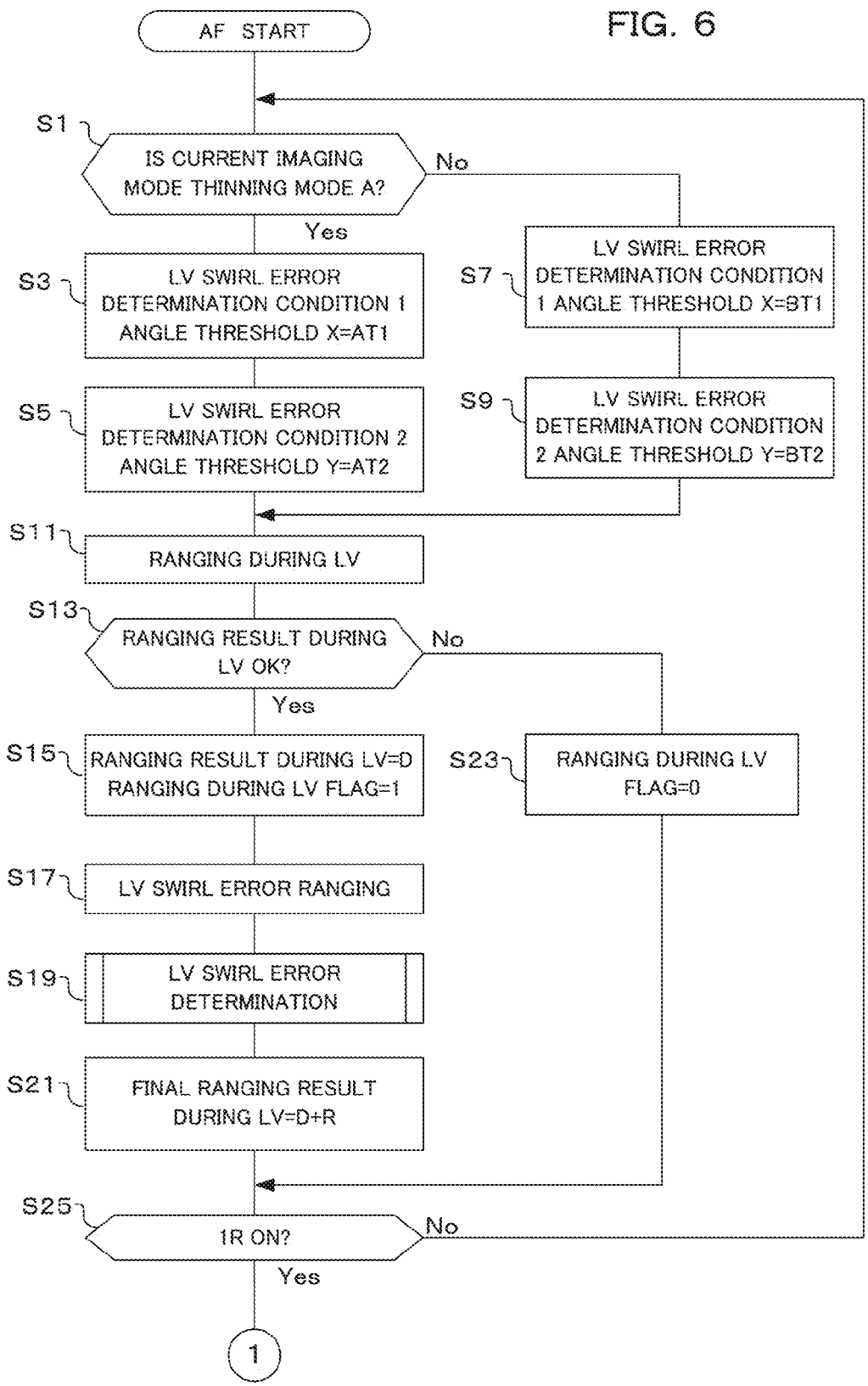

IMAGING APPARATUS AND IMAGING METHOD FOR CONTROLLING AUTO-FOCUS

Benefit is claimed, under 35 U.S.C. § 119, to the filing date of prior Japanese Patent Application No. 2015-127454 filed on Jun. 25, 2015. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus, having focus detection pixels arranged on an imaging surface, for carrying out focus detection using phase difference AF, and being capable of correcting swirl error that arises in a subject having inclination with respect to a detection direction, and to an imaging method.

2. Description of the Related Art

Imaging surface phase difference AF, where focus detection pixels that have a phase difference detection capability are arranged on parts of an image sensor, and focus detection is carried out using phase difference AF, is known. It is also known, in a case of carrying out imaging in order to display a live view image, to perform readout at high speed by thinning out some pixels within the image sensor, in order to increase the readout speed (frame rate) (refer to FIG. 2, which will we described later).

When reading out a pixel signal from the image sensor by thinning, if thinning is carried out so that there is reduced readout of focus detection pixels in order to improve image quality of the live view image, there will be a reduction in precision of phase difference AF. In the imaging apparatus disclosed in Japanese patent publication 2010-181751 (hereafter referred to as "patent publication 1"), therefore, AF priority mode and image quality priority mode are provided, and readout is carried out in accordance with each mode.

Depending on arrangement of the focus detection pixels, precision of phase difference AF is lowered if there is inclination of a subject image with respect to the phase difference detection direction. This is because when different pixel rows of opening sections that have been provided on the focus detection pixels for detecting phase difference are arranged in a direction perpendicular to the phase difference detection direction, for a subject image that has contrast edge portions of the subject image inclined with respect to the phase difference detection direction, phase is offset by a rotation angle of contrast edge sections of the subject image, even in a focused state (refer to FIG. 2, which will be described later). In order to address this point, with the imaging apparatus disclosed in Japanese patent laid-open No. 2014-137505 (hereafter referred to as "patent publication 2") it is proposed to correct phase offset due to rotation angle of the focus detection pixel arrangement.

In previously described patent publication 1, reduction in AF precision due to phase offset by a rotation angle that arises when focus detection pixels have been arranged is not resolved. Also, in patent publication 2 no consideration whatsoever has been given to the case where focus detection pixels have been reduced in number due to a thinned readout mode.

SUMMARY OF THE INVENTION

An object of the present invention is to provide an imaging apparatus, and imaging method, capable of ranging taking into consideration swirl error due to inclination of a subject, even in a case where thinned readout has been carried out from an image sensor.

An imaging apparatus of a first aspect of the present invention, has an image sensor that is provided with a plurality of pixels having photoelectric conversion sections that convert an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, and comprises a readout section that thins and reads out a pixel signal of focus detection pixels of the image sensor, a focus detection section that detects an out of focus amount and an out of focus direction by carrying out a focus detection operation using phase difference detection based on the pixel signal of the focus detection pixels that has been thinned and read out, a swirl error determination section that determines swirl error arising in accordance with inclination of an optical image with respect to a direction that is orthogonal to a phase difference detection direction, based on the pixel signal of the focus detection pixels that has been thinned and read out, an AF operation instruction section that instructs an AF operation, and an AF control section that carries out an AF operation in accordance with an instruction of the AF operation instruction section, wherein the AF control section determines whether or not an AF operation will be carried out adopting output of the focus detection section based on output of the swirl error determination section, in accordance with an instruction for AF operation of the AF operation instruction section.

An imaging method of a second aspect of the present invention, is for an imaging apparatus having an image sensor that is provided with a plurality of pixels having photoelectric conversion sections that convert an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, and comprises a readout step that thins and reads out a pixel signal of focus detection pixels of the image sensor, a focus detection step that detects an out of focus amount and an out of focus direction by carrying out a focus detection operation using phase difference detection based on the pixel signal of the focus detection pixels that has been thinned and read out, a swirl error determination step that determines swirl error arising in accordance with inclination of an optical image with respect to a direction that is orthogonal to a phase difference detection direction, based on the pixel signal of the focus detection pixels that has been thinned and read out, and an AF operation determination step that determines whether or not to carry out AF operation adopting results of the focus detection operation, based on determination result for the swirl error, in accordance with an AF operation instruction.

BRIEF DESCRIPTION OF THE DRAWINGS

FIG. 3A and FIG. 3B are drawings for describing thinned readout, with the camera of one embodiment of the present invention.

FIG. 6 is a flowchart showing AF operation of the camera of one embodiment of the present invention.

DETAILED DESCRIPTION OF THE PREFERRED EMBODIMENTS

An example where a digital camera is adopted as one embodiment of the present invention will be described in the following. This digital camera has an imaging section, with a subject image being converted to image data by this imaging section, and the subject image being subjected to live view display on a display arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display if playback mode is selected.

Also, with this embodiment, pixel rows of ranging areas for detection of phase difference using phase difference AF are respectively divided into n lines (n≥3). For each divided line, n−1 rotation angles between adjacent lines, and rotation angles between lines that are made to overlap for a number of lines more than n−1 are calculated (for example, refer to FIG. 5A-FIG. 5C, and S17 in FIG. 6). During live view display swirl error determination is carried out from n or more rotation angles, and automatic focus adjustment during live view display is carried out in accordance with swirl error amount that has been acquired at this time (refer, for example, to S19 and S21 in FIG. 6). In carrying out swirl error determination, thinning rate at the time of readout of the image sensor is considered (refer, for example, to FIG. 3A, FIG. 3B, S3, S5, S7 and S9 in FIG. 6, and S53 and S57 in FIG. 8).

Figure 1:
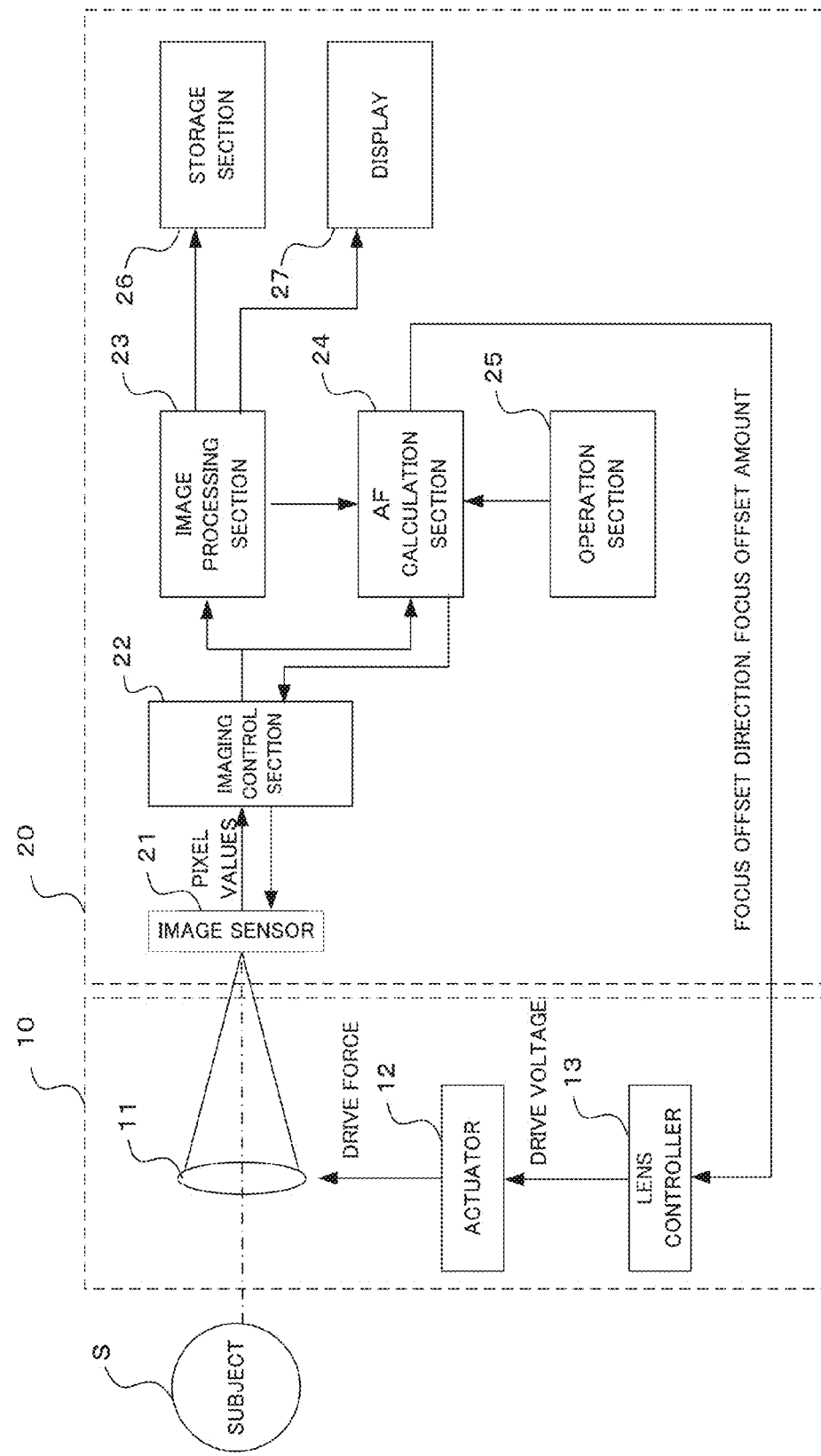
FIG. 1 is a block diagram mainly showing the electrical structure of a camera of one embodiment of the present invention.

FIG. 1 is a block diagram mainly showing the electrical structure of a camera of one embodiment of the present invention. The camera relating to this embodiment comprises an interchangeable lens barrel 10 and a camera body 20. With this embodiment, the interchangeable lens barrel 10 and a camera body 20 are configured separately, but they may also be constructed integrally, like a general compact camera.

A photographing lens 11 is arranged inside the interchangeable lens barrel 10. The photographing lens 11 is constituted by a plurality of optical lenses for forming an optical image of a subject S. An actuator 12 and a lens control section 13 are also arranged inside the interchangeable lens barrel 10. The lens control section 13 has a lens control circuit that controls drive of the actuator 12. The lens control section 13 receives out of focus direction and out of focus amount from an AF calculation section 24 inside the camera body 20, and carries out control of the actuator 12 based on these items of information. The actuator 12 moves the photographing lens 11 in the optical axis direction to carry out focusing.

An image sensor 21, imaging control section 22, image processing section 23, AF calculation section 24, storage section 24, operating section 25, storage section 26 and display 27 are provided within the camera body 20.

The image sensor 21 is arranged on the optical axis of the photographing lens 11, close to a position where a subject image is formed. The image sensor 21 is provided with a plurality of pixels that have a photoelectric conversion section for converting the subject image (optical image) to an electrical signal. Specifically, the image sensor 21 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The plurality of photodiodes correspond to the plurality of pixels described above.

Figure 2:
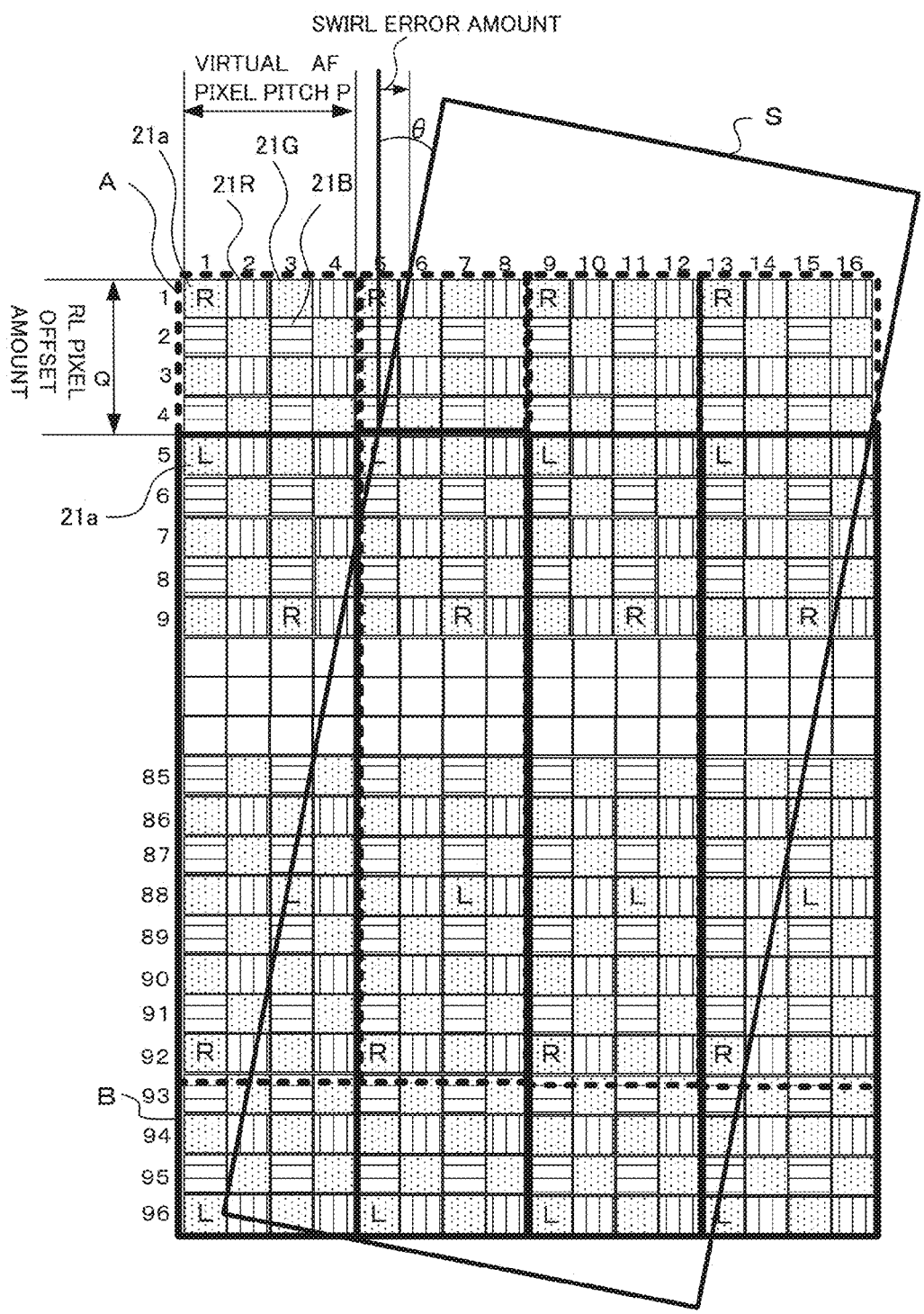
FIG. 2 is a plan diagram showing the structure of part of an image sensor of a camera of one embodiment of the present invention.

Also, as shown in FIG. 2, the plurality of pixels of the image sensor 21 include phase difference AF detection pixels (hereafter referred to as "focus detection pixels") 21a configured so as to restrict the incident direction of light flux incident on the pixels, and imaging pixels 21R, 21G and 21B configured so as to restrict the light flux incident on the pixels less than the focus detection pixels. The image sensor 21 outputs pixel values that have been output from the focus detection pixels and the imaging pixels to the imaging control section 22. Arrangement of the focus detection pixels 21a and the imaging pixels 21R, 21G and 21B of the image sensor 21 will be described later using FIG. 2.

The image sensor 21 is provided with a plurality of pixels that have photoelectric conversion sections for converting an optical image that has been performed by an imaging image sensor 21 into an electrical signal, includes focus detection pixels that are configured so as to restrict incident direction of light flux that is incident on the pixels and imaging pixels that are configured to restrict light flux that is incident on the pixels less than the focus detection pixels, and functions as an image sensor on which the plurality of pixels are arrayed two dimensionally.

The imaging control section 22 has an imaging control circuit, and, after pixel values have been read out from pixels of the image sensor 21 and subjected to image processing such as A/D conversion, these pixel values are output to the image processing section 23 and the AF calculation section 24. Readout of pixel values is readout of all pixels in accordance with instruction from the AF calculation section 24, and is carried out by either thinned read out A or B (refer to FIG. 3A and FIG. 3B regarding thinned read out A and B).

The imaging control section 22 functions as a readout section for thinned readout of a pixel signal of the focus detection pixels of the image sensor. The readout section performs thinned readout of a pixel signal of the focus detection pixels as well as thinned readout of a pixel signal of the imaging pixels (refer, for example, to FIG. 3A and FIG. 3B), and a display, which will be described later, performs display based on the pixel signal of the imaging pixels that has been subjected to thinned readout. This readout section has a plurality of thinning systems, and the plurality of thinning systems have different thinning rates (refer, for example, to FIG. 3A and FIG. 3B).

The image processing section 23 has an image processing circuit, is input with pixel values from the imaging pixels 21R, 21G and 21B, among the pixel values, and carries out image processing for a live view display image and a storage image. The image processing section 23 also outputs image data that has been processed for storage to the storage section 26, and outputs image data that has been subjected to image processing for live view display to the display 27. The storage section 26 is an electrically rewritable non-volatile memory, to which image data for storage is input and stored.

The display 27 is input with image data for live view display and image data for playback, and carries out display of a live view image or a playback image on a display panel such as an LCD or organic EL, based on the image data. The display 27 functions as a display for carrying out display based on a pixel signal of imaging pixels that has been read out from the image sensor.

The AF calculation section 24 has a CPU (Central Processing Unit) and peripheral circuits for the CPU, and carries out AF control and overall control of the camera in accordance with programs stored in memory. The AF calculation section 24 is input with pixel values from the focus detection pixels 21a, among the pixel values, and calculates out of focus direction and out of focus amount using a phase difference AF method. At the time of AF calculation, a first addition output is created by adding outputs of focus detection pixels that are arranged in a direction perpendicular to the out of focus direction, and the out of focus amount is calculated based on this first addition output.

Also, the AF calculation section 24 creates a second addition output with a number of pixels, among the outputs of the focus detection pixels 21a that are arranged in a direction perpendicular to the out of focus direction, that is fewer than the focus detection pixels 21a that were used with the first addition output, and determines swirl error for the optical image based on this second addition output. If the result of this determination is that there is swirl error, correction of out of focus amount is carried out. Determination of swirl error will be described later using FIG. 4 and FIG. 5A-FIG. 5C.

Figure 7:
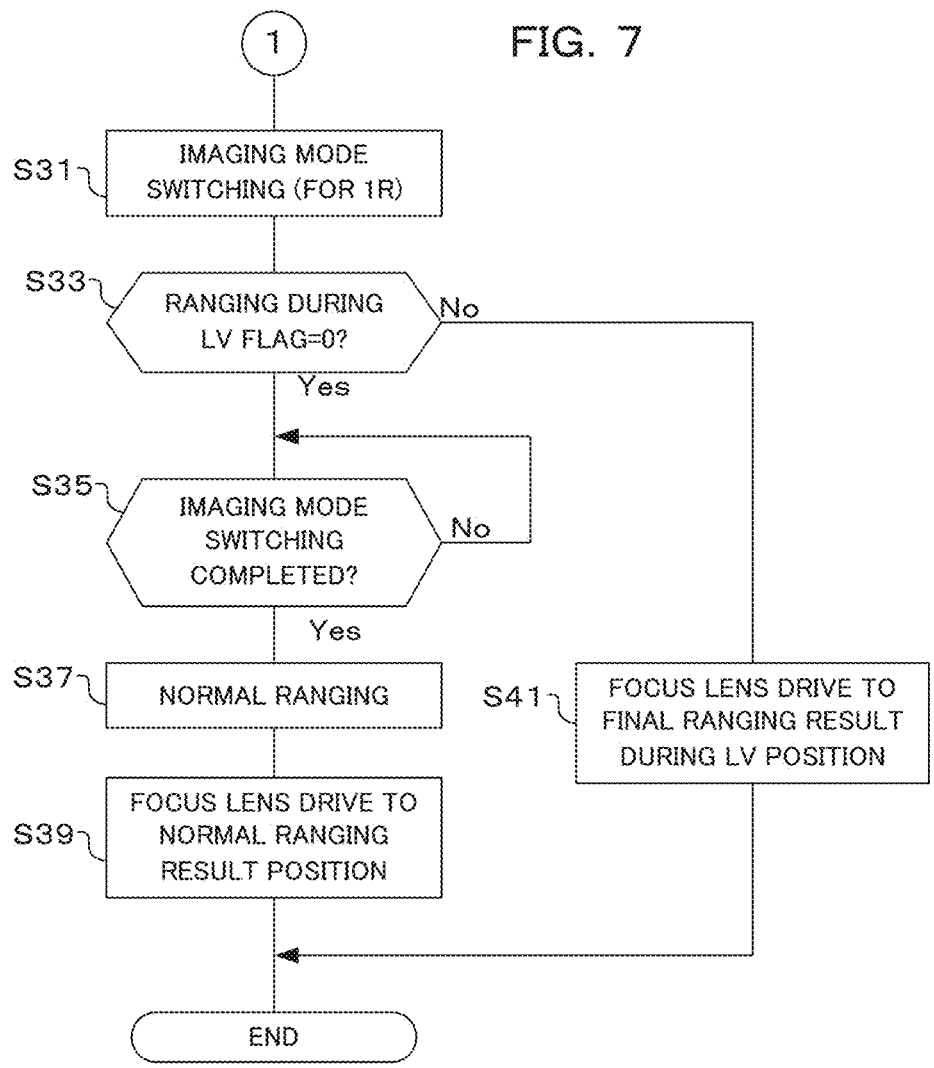
FIG. 7 is a flowchart showing AF operation of the camera of one embodiment of the present invention.

The AF calculation section 24 functions as a focus detection section that detects an out of focus amount and an out of focus direction by carrying out a focus detection operation using phase difference detection based on the pixel signal of the focus detection pixels that has been thinned and read out (refer, for example, to S11 in FIG. 6 and S37 in FIG. 7). The AF calculation section 24 also functions as a swirl error determination section for determining swirl error that arises in accordance with inclination of an optical image with respect to a direction that is orthogonal to the phase difference detection direction, based on a pixel signal for the focus detection pixels that has been thinned and read out (refer, for example, to S19 in FIG. 6, and to FIG. 8). The AF calculation section 24 also functions as an AF control section for carrying out an AF operation in accordance with an instruction of the AF operation instruction section (refer, for example, to S25 Yes in FIG. 6, and to FIG. 7). This AF control section determines whether or not an AF operation will be carried out adopting output of the focus detection section based on output of the swirl error determination section, in accordance with an instruction for AF operation of the AF operation instruction section (refer, for example, to S33 in FIG. 7).

The AF calculation section 24 also functions as an AF control section for, when it is determined that swirl error is small based on output of the swirl error determination section, carrying out an AF operation based on output of the focus detection section in accordance with an instruction of the AF operation instruction section (refer, for example, to S41 in FIG. 7). Also, when it is determined that swirl error is large based on output of the swirl error determination section, in accordance with an instruction of the AF operation instruction section, the AF control section also carries out an operation to read out a pixel signal of the focus detection pixels using the readout section without thinning, and carries out a focus detection operation using the focus detection section based on a pixel signal of the focus detection pixels that has been read out (refer, for example, to S37 and S35 in FIG. 7).

The swirl error determination section changes a threshold for determining swirl error based on a pixel signal of the focus detection pixels that has been read out, in accordance with a thinning system (refer, for example, to S3, S5, S7 and S9 in FIG. 6). The focus detection section corrects a focus detection result based on a determination result of the swirl error determination section (refer, for example, to S21 in FIG. 6).

The operating section 25 that is connected to the AF calculation section 24 has various operation members such as a power supply button, release button, menu button etc., and detects operating state of these operation member, outputting detection results to the AF calculation section 24. If the release button is pressed down half way a 1st release switch (1RSW) is turned on, and if the release button is further pressed down fully, a 2nd release switch (2RSW) is turned on. The operating section 25 functions as an AF operation instruction section for instructing AF operation.

Next, the structure of the image sensor 21 of this embodiment will be described using FIG. 2. A plurality of focus detection pixels 21a and a plurality of imaging pixels 21R, 21G and 21B are arranged on the imaging surface of the image sensor 21, as shown in FIG. 2. As described above, a Bayer array RGB filter is arranged on the front surface of the imaging pixels 21R, 21G and 21B. Green (G) filters (shown by a dotted pattern in FIG. 2) are provided on the front surfaces of the imaging pixels 21G, red (R) filters (shown by vertical stripes in FIG. 2) are provided on the front surfaces of the imaging pixels 21R, and blue (B) filters (shown by horizontal stripes in FIG. 2) are provided on the front surfaces of the imaging pixels 21B. It should be noted that green (G) filters are provided on the front surfaces of the focus detection pixels 21a.

Also, the focus detection pixels 21a are provided with opening sections so as to restrict the incident direction of light flux that is incident on the pixels. In the drawing, the focus detection pixels 21a that are designated "R" receive light flux that is incident from the right side, and right openings are provided so as to restrict light flux that is incident from the left side (in the following this may be abbreviated to R pixels). Also, the focus detection pixels 21a that are designated "L" receive light flux that is incident from the left side, and left openings are provided so as to restrict light flux that is incident from the right side (in the following this may be abbreviated to L pixels). Here, the right side and the left side are the right side and the left side along the phase difference detection direction, when carrying out a focus detection operation using a phase difference AF method.

Regarding the focus detection pixels 21, when carrying out phase difference detection R pixel values and L pixel values in the vertical direction are respectively added, and calculation of out of focus amount is carried out using an R pixel addition value and an L pixel addition value for every pixel pitch (R: right opening, L: left opening). In FIG. 2, the phase difference detection direction is the horizontal direction, and the R pixels and L pixels are arranged 4 pixels at a time in a direction that is orthogonal to the phase difference detection direction. In a case where a subject image S is inclined at an angle θ from the direction that is orthogonal to the phase difference detection direction, and error arises in a ranging result that is an amount of offset of these four pixels. Swirl error amount of the imaging surface in this case becomes as shown in equation (1).

$$\text{swirl error amount} = \tan θ \times RL \text{ pixel offset amount} \quad (1)$$

Figures 3A, 3B:
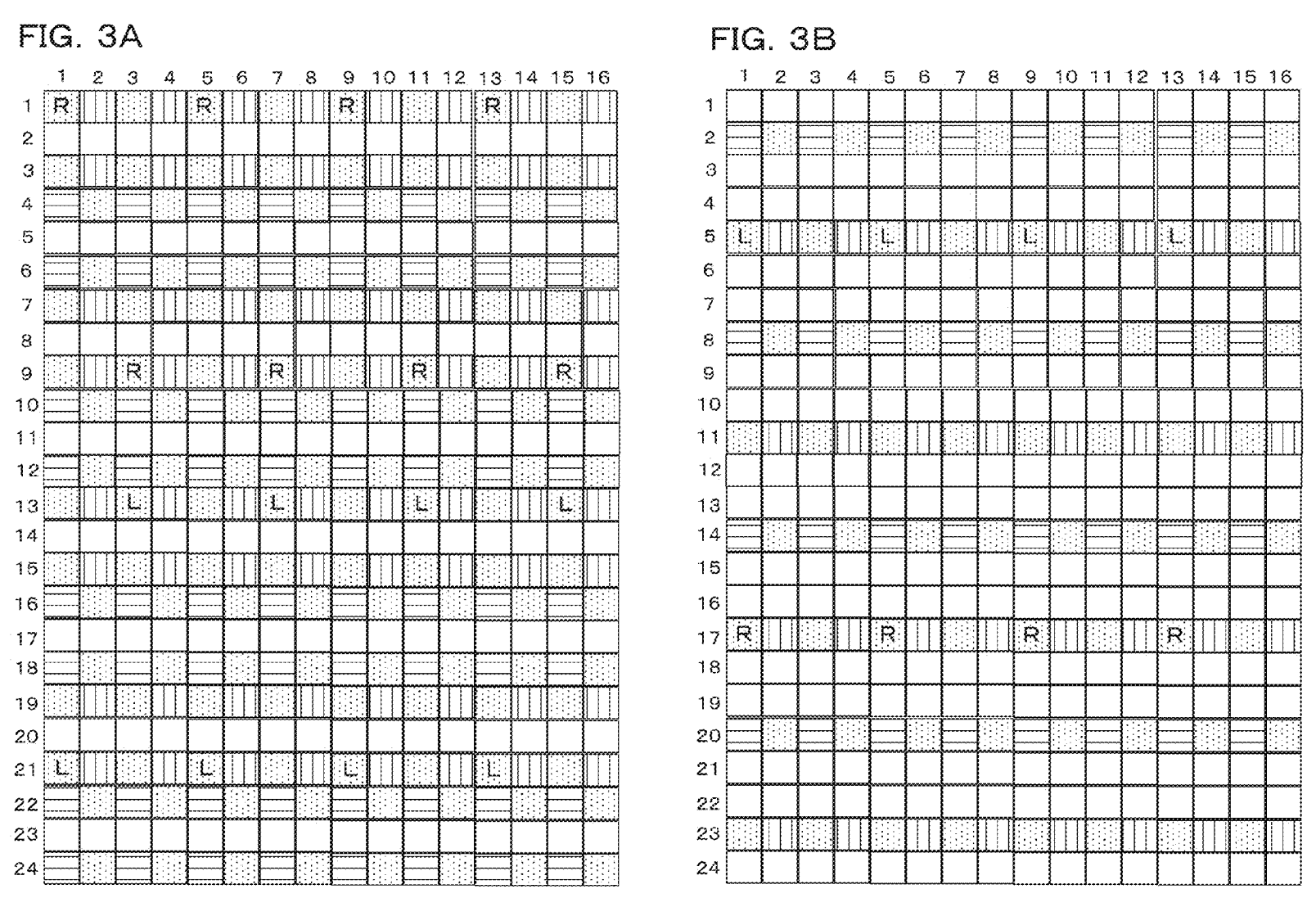

Next, the thinned readout mode at the time of performing live view display will be described using FIG. 3A and FIG. 3B. In FIG. 3A and FIG. 3B, readout is performed for lines (line direction) where a dotted pattern, vertical stripes, or horizontal stripes has been applied within pixels, and readout is not performed for lines (line direction) where a dotted pattern, vertical stripes or horizontal stripes has not been applied.

FIG. 3A is a case of thinning mode A, and in this thinning mode A readout is performed for two out of every three lines, such as for line 1, line 3, line 4, line 6, line 7 . . . , and readout is not performed for the other line within each set of three lines. As will be understood by comparison with FIG. 2, L pixels for phase difference detection are arranged in line 5, and R pixels are arranged in line 17, but with the example shown in FIG. 3A these R pixels and L pixels are not used in phase difference detection and precision is lowered.

Also, FIG. 3B is a case of thinning mode B, and in this thinning mode B readout is performed for one line in every three lines, such as for line 2, line 5, line 8, line 11, . . . , and readout is not performed for the other two lines. Compared to the case of thinning mode A shown in FIG. 3A, since the thinning rate is high it is possible to carry out pixel readout at a higher speed, enabling image display at a higher frame rate.

Also, in the case of thinning mode B, as will be understood from comparison with FIG. 2, R pixels for phase difference text are arranged on line 1 and on line 9, and L pixels are arranged on line 13 and on line 21, but with the example shown in FIG. 3B these R pixels and L pixels are not used in phase difference detection. This means that compared to the case of FIG. 3A precision is lowered further.

Figure 4:
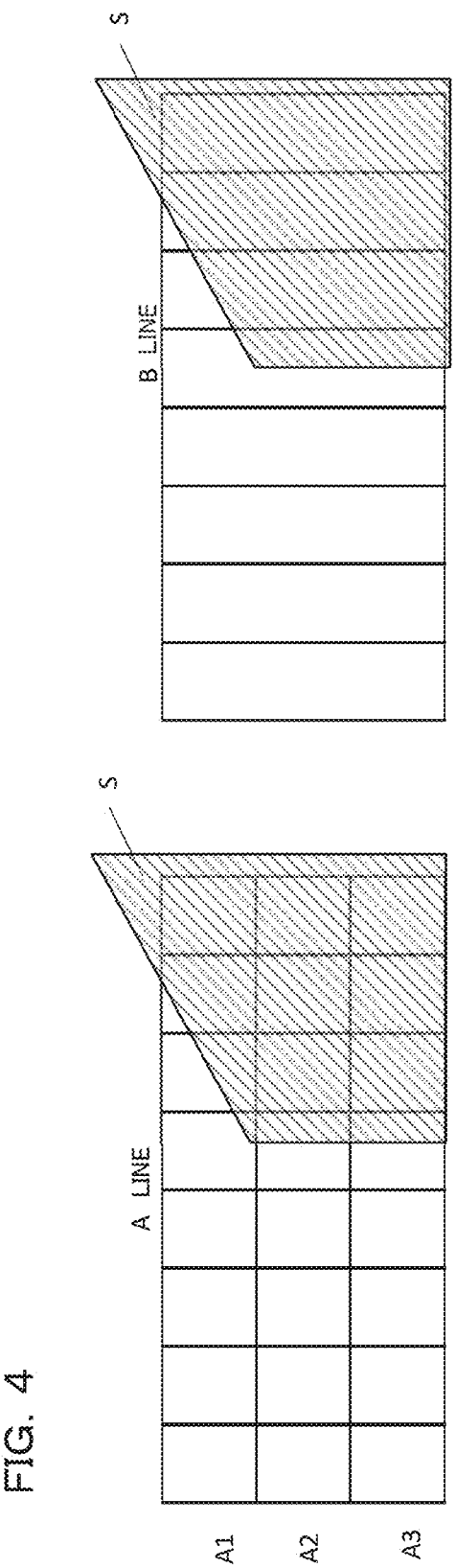
FIG. 4 is a diagram showing appearance of ranging areas on the surface of an image sensor, and projecting a subject having a plurality of angles onto the ranging areas, in the camera of one embodiment of the present invention.

Next, the division of ranging areas of this embodiment will be described using FIG. 4. FIG. 4 shows appearance when a subject image S having a plurality of angles, with respect to a direction that is orthogonal to a phase difference detection direction, on a left side of the subject image S, is projected onto ranging areas. The A line shown on the left side of FIG. 4 is a virtual reference pixel column, and addition values for pixel values of R pixels within focus detection pixels for every dotted line region (A) having a width corresponding to the virtual AF pixel pitch in FIG. 2 are shown as a virtual pixel column. In the A line of FIG. 4, a plurality of R pixels are arranged in the vertical direction as shown in FIG. 2, and an addition value is obtained for each region. Eight columns are depicted on the A line of FIG. 4, but in actual fact many more columns are arranged, and a pixel value pattern corresponding to a subject image for the reference pixel column is obtained using addition values corresponding to each column.

Also, the B line shown on the right side of FIG. 4 is a virtual reference pixel column, and addition values for pixel values of L pixels within focus detection pixels for every solid line region (B) having a width corresponding to the virtual AF pixel pitch in FIG. 2 are shown as a virtual pixel column. Similarly to the case for the A line, an addition value is obtained for every region, and a pixel value pattern corresponding to a subject image for the virtual reference pixel column is obtained using addition values corresponding to each region. If pixel value patterns have been obtained for the subject on the virtual reference pixel column and the virtual reference pixel column, phase difference can be detected by carrying out correlation calculation of these two subject image pixel value patterns (outputs of virtual line sensors), and from this it is possible to calculate defocus amount of the photographing lens 11, namely an offset amount with respect to a focus position.

The A line is also divided into three equal parts, namely A1, A2 and A3, in a vertical direction, which is a direction orthogonal to the phase difference detection direction, for each column. Swirl error determination at the time of a swirl error, and rotation angle, are then detected using an addition value for pixel values of focus detection pixels that belong to the divided regions.

Figure 5A:
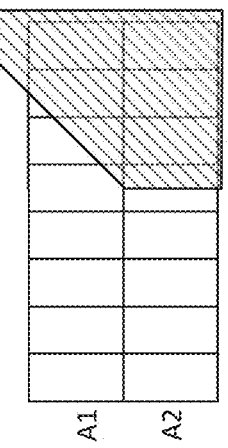
FIG. 5A to FIG. 5C are drawings showing combinations of correlation calculations within ranging areas for the purpose of swirl error correction, with the camera of one embodiment of the present invention.
Figure 5B:
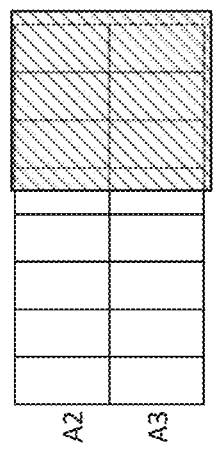
Figure 5C:
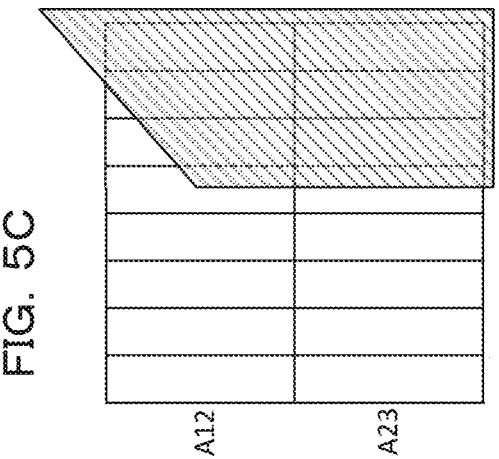

FIG. 5A to FIG. 5C show combinations of correlation calculation that have used each of the divided regions A1, A2, A3 of the A line shown in FIG. 4, at the time of swirl error correction. Rotation angles are respectively detected from an A1-A2 correlation calculation for adjacent line 1 (FIG. 5A), which is between lines vertically adjacent at each divided line (calculation to acquire correlation of outputs A1 and A2), and an A2-A3 correlation calculation for adjacent line 2 (FIG. 5B) (calculation to acquire correlation of outputs A2 and A3). Rotation angle is further calculated from an A12-A23 correlation calculation for adjacent 2 line addition (FIG. 5C) resulting from 2 line addition of adjacent lines (calculation to obtain correlation of outputs A12 and A23). Swirl error correction determination is carried out and correction amount is calculated from these three rotation angles that have been detected (refer to equation (1) above regarding swirl error correction amount). It should be noted that A1, A2 and A3 are addition values for each region, A12 is an addition value for regions A1 and A2, and A23 is an addition value for regions A2 and A3.

A method of calculating rotation angle will be described in the following. Equation (2) below is a modification of equation (1) that was described based on FIG. 2.

$$\text{Rotation angle } θ = \tan^{-1}(\text{swirl error amount}/RL \text{ pixel offset amount}) \quad (2)$$

Swirl error amount is obtained using the method described below, and rotation angle θ is calculated based on equation (2) above. Swirl error amounts are respectively calculated using an A1-A2 correlation calculation, A2-A3 correlation calculation, and A12-A23 correlation calculation, and by substituting into equation (2) above it is possible to calculate respective rotation angles. For example, with the A2-A3 correlation calculation a correlation calculation for outputs of a virtual line sensor A2, representing A2 of the A line in FIG. 4, and a virtual line sensor A3 representing A3, is carried out. Edges having high contrast of the left side of the subject image S are projected onto the virtual line sensor A2 and the virtual line sensor A3. Since the edge sections run in a direction that is orthogonal to the phase difference detection direction, a rotation angle of the subject image with respect to the virtual line sensors A2 and A3 is 0. Once correlation calculation for outputs of the virtual line sensor A2 and the virtual line sensor A3 has been carried out, a correlation offset amount becomes 0.

Conversely, in a case where a subject image S having a contrast edge that forms an angle θ with respect to the phase difference detection direction, such as shown in FIG. 2, is projected onto the virtual line sensors A1 and A2, once a correlation calculation for outputs of the virtual line sensor A1 and the virtual line sensor A2 has been carried out using an A1-A2 correlation calculation, a correlation offset amount representing a size corresponding to size of the angle θ can be obtained. By taking into consideration the results of correlation calculations for associated outputs of a plurality of virtual line sensors that have been divided in a direction that is orthogonal to the phase difference detection direction in this way, namely the A1-A2 correlation calculation, A2-A3 correlation calculation, and A12-A23 correlation calculation, it is possible to detect rotation angle of a subject image that has been projected onto a virtual line sensor A.

Figure 8:
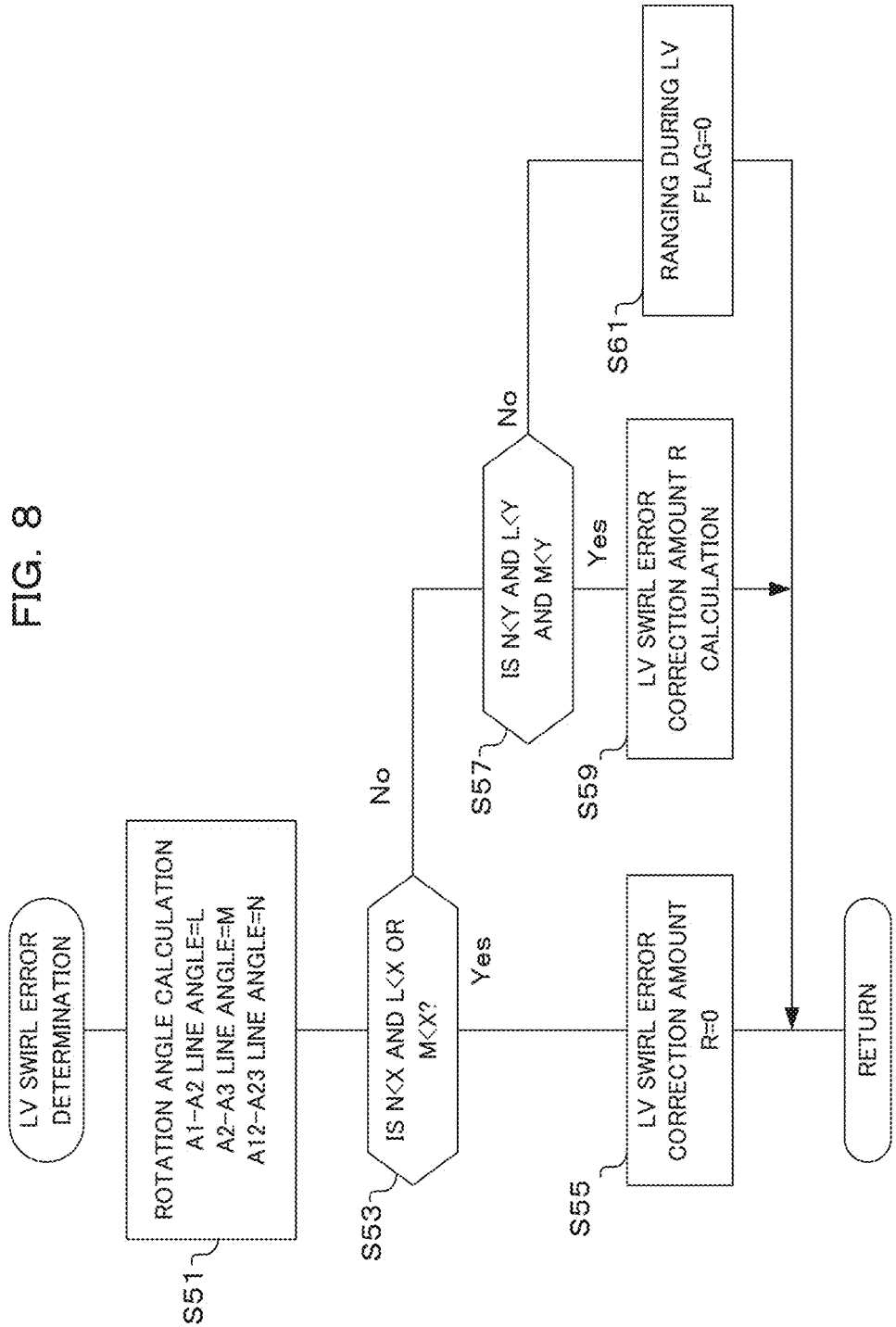
FIG. 8 is a flowchart showing operation of swirl error determination for live view (LV) in the camera of one embodiment of the present invention.

Next, AF operation of this embodiment will be described using the flowcharts shown in FIG. 6 to FIG. 8. This flow is executed by controlling each section within the camera in accordance with a program that has been stored in the memory and that is executed by a CPU within the AF calculation section 24.

Once the AF operation flow of FIG. 6 is commenced, it is first determined whether or not the current imaging mode is thinning mode A (S1). In this embodiment, thinning mode A and thinning mode B are available as thinning modes, as was described using FIG. 3. The photographer can set the thinning mode on a menu screen or the like. It should be noted that besides the photographer setting the thinning mode manually, the thinning mode may be automatically set in accordance with a mode that has been set. For example, in a case where power reduction mode is set, in order to lower the frame rate and reduce power consumption, the thinning mode A may be automatically set. It is also possible for the photographer to manually set the frame rate, and for thinning mode B to be set if a high frame rate is set. Alternatively, a shake detection section or pan tilt detection section may be used to detect that handshake is occurring or that panning is in progress, and a high frame rate automatically set and thinning mode B set.

If the result of determination in step S1 is that thinning mode A has been set, angle threshold X=AT1 is set as live view (LV) swirl error determination condition 1 (S3). LV swirl error determination condition 1 is used in the swirl error determination of step S53 (refer to FIG. 8).

Once setting of the angle threshold X has been carried out in step S3, next angle threshold Y=AT2 is set as LV swirl error determination condition 2 (S5). LV swirl error determination condition 2 is used in the swirl error determination of step S57 (refer to FIG. 8).

On the other hand, if the result of determination in step S1 is not thinning mode A, namely that it is thinning mode B, angle threshold X=BT1 is set as live view (LV) swirl error determination condition 1 (S7). As was described previously, LV swirl error determination condition 1 is used in the swirl error determination of step S53 (refer to FIG. 8).

Once setting of the angle threshold X has been carried out in step S7, next angle threshold Y=BT2 is set as LV swirl error determination condition 2 (S9). As was described previously, LV swirl error determination condition 2 is used in the swirl error determination of step S57 (refer to FIG. 8).

If the angle threshold Y has been set in step S5 or S9, ranging during live view (LV) is carried out (S11). Here, using data from the focus detection pixels within image data that has been read out from the image sensor 21 in thinning mode A or thinning mode B, the AF calculation section 24 carries out correlation calculation for the A line and B line that were shown in FIG. 4, and calculates defocus amount of the photographing lens 11.

Once the ranging during live view has been carried out, it is next determined whether or not a result for ranging during live view (LV) is OK (S13). If reliability is high in the result of the correlation calculation of step S11, a ranging result of OK is determined, and if reliability is low a ranging result of NG is determined. As a reliability determination representing ranging result OK/NG, it is determined, for example, whether a minimum value of an evaluation value (correlation value) is smaller than a given value, and whether or not gradient of an evaluation value close to a minimum value is larger than a given value, as in patent publication 2.

If the result of determination in step S13 is that the ranging result is not OK, then a ranging during live view (LV) flag is set to "0" (S23). This ranging during LV flag is used in step S33 (refer to FIG. 7) which will be described later.

On the other hand, if the result of determination in step S13 is that the ranging result is OK, in steps S15 to S21 a final ranging result is calculated after having carried out determination of swirl error. First, a ranging result during live view (LV) is made "D", and the ranging during live view (LV) flag is set to "1" (S15). The ranging during LV result is the ranging calculation result of step S11, and the ranging during LV flag is used in step S33 (refer to FIG. 7), as was described previously.

Next, ranging for live view (LV) swirl error is carried out (S17). Here, virtual pixel columns A1, A2 and A3 resulting from dividing the virtual pixel column A line shown in FIG. 4 in a direction orthogonal to the phase difference detection direction are created using image data that was used in the ranging of step S11, and a correlation calculation for adjacent line 1 shown in FIG. 5A (A1-A2 correlation calculation), a correlation calculation for adjacent line 2 shown in FIG. 5B (A2-A3 correlation calculation), and a correlation calculation for adjacent 2 line addition shown in FIG. 5C (A12-A23 correlation calculation) are carried out. Data relating to respective rotation angles are then calculated from the respective correlation calculations.

Once ranging for LV swirl error has been carried out, next live view (LV) swirl error determination is carried out (S19). Here it is determined whether or not swirl error as shown in FIG. 2, FIG. 4, and FIG. 5A-FIG. 5C is occurring, and if swirl error has occurred swirl error correction amount R is calculated. Detailed operation of this LV swirl error determination will be described later using FIG. 8.

Once LV swirl error determination has been carried out, next a final ranging result during live view (LV) is calculated (S21). Here, the swirl error correction amount R that was calculated in step S19 is added to the ranging during LV result D of step S15 (that is, D+R is calculated), to obtain the final ranging result during LV.

If the final ranging result during LV has been obtained in step S21, or if the ranging during LV flag is set to "0" in step S23, it is next determined whether or not 1R is on (S25). If the photographer presses the release button down half way the 1R switch will be turned on, and so in this step determination is based on the state of the 1R switch. If the result of this determination is not that 1R is on, processing returns to step S1 and the operations described above are repeated.

On the other hand, if the result of determination in step S25 is that 1R is on, imaging mode switching is carried out (S31). Since the release button has been pressed down halfway, image data readout is switched from thinning mode A or B to all pixel readout mode in order to prepare for transferring to a shooting operation, in anticipation of the release button being pressed down fully at some future point Next it is determined whether or not the ranging during live view (LV) flag is "0" (S33). In step S11 ranging is carried out by phase difference AF, using image data for live view display. Therefore, if the ranging result is OK, the ranging during LV flag is set to "1" in step S15, while if the range and result is NG the ranging during LV flag is set to "0" in step S23.

If the result of determination in step S33 is that the ranging during LV flag is not "0", namely that the ranging result during LV was OK, focus lens drive is carried out to the final ranging result during LV position (S41). Since the ranging result during LV that was carried out using thinned image data was OK, focus drive of the photographing lens 11 is carried out based on this ranging result.

On the other hand, if the result of determination in step S33 is that the ranging during LV flag is "0", namely that the ranging result during LV was NG, phase difference AF is carried out using image data resulting from readout of all pixels in steps S35-S39. First, in step S35 it is determined whether or not imaging mode switching has been completed (S35). In step S31 switching from thinning mode to all pixel readout mode is commenced. In this step it is determined whether or not this switching has been completed. If switching has not been completed, completion of switching is awaited.

If the result of determination in step S35 is that imaging mode switching is complete, normal ranging is carried out (S37). Here ranging is carried out by phase difference AF using data of all focus detection pixels, using image data that was acquired by all pixel readout from the image sensor 21.

Once normal ranging has been carried out, next the focus lens is driven to the normal ranging result position (S39). Here the focus lens within the photographing lens 11 is driven to the focus position based on a ranging value that was calculated in the normal ranging of step S37. Once the focus lens drive of step S39 or S41 has been carried out, the flow for AF operation is terminated.

In this way, in the flow for AF operation, during live view display, ranging is carried out using image data resulting from thinned readout for this live view display (S11). If this ranging result is OK, a final ranging result is obtained based on ranging result D and swirl error correction amount R (S13 Yes—S21), and focus lens drive is carried out based on the final ranging result in accordance with an AF operation instruction (S33 No, S41). This means that even in a case where thinned read-out has been carried out for display of a live view image, ranging taking into consideration swirl error due to inclination of the subject image becomes possible.

Also, if the ranging result during live view is NG, focus lens drive is carried out in accordance with a ranging result that has been acquired using image data of all pixel readout in response to an AF operation instruction (S33 Yes—S39). This means that even if a high reliability ranging value is not acquired during live view, if there is an AF operation instruction it is possible to acquire a high reliability ranging value.

Next, operation of the LV swirl error determination in step S19 will be described using the flowchart shown in FIG. 8. If the flow for LV swirl error determination is entered, first calculation of rotation angle is carried out (S51). Here, angle L for an A1-A2 line, angle M for an A2-A3 line, and angle N for an A12-A23 line, which are rotation angles calculated using the A1-A2 correlation calculation, A2-A3 correlation calculation and A12-A23 correlation calculation, are calculated from the ranging result of the ranging for LV swirl error of step S17 (refer to FIG. 6) (equation (2)).

If the rotation angles have been calculated, it is next determined whether or not "N<X" and "L<X or M<X" hold (S53). Here it is determined whether or not the A12-A23 line angle N that was calculated in step S51 is smaller than the angle threshold X of LV swirl error determination condition 1 that was set in step S3 or S7. It is also determined whether or not the A1-A2 line angle L or the A2-A3 line angle M that were calculated in step S51 is smaller than the angle threshold X.

In the event that the result of determination in step S53 was Yes, LV swirl error correction amount R is made 0 (S55). If the determination result in step S53 is Yes, it means that swirl error amount θ (Refer to FIG. 2) is close to 0, swirl error correction amount R is made 0.

If the determination result in step S55 is No, it is next determined whether or not "N<Y" and "L<Y" and "M<Y" hold (S57). Here it is determined whether or not the A12-A23 line angle N that was calculated in step S51 is smaller than the angle threshold Y of LV swirl error determination condition 2 that was set in step S5 or S9. It is also determined whether or not the A1-A2 line angle L that was calculated in step S51 is smaller than the angle threshold Y. It is also determined whether or not the A2-A3 line angle M that was calculated in step S51 is smaller than the angle threshold Y.

In the event that the result of determination in step S57 was Yes, LV rotation correction amount R is calculated (S59). If the determination result in step S57 is Yes, then the rotation angles L, M and N that were calculated in step S51 are all less than the angle threshold Y, precision of the ranging value that was calculated in step S11 is comparatively high, and it is a case where correction based on rotation angle is possible. In this case, swirl error amount is calculated in accordance with equation (1) above, and the positive or negative sign is reversed to calculate swirl error correction amount R as correction amount.

If the result of determination in step S57 is No, "0" is set as the ranging during LV flag (S61). If the determination result in step S57 is No, then the rotation angles L, M and N that were calculated in step S51 are significantly large, precision of the ranging value that was calculated in step S11 is low, and it is a case where correction based on rotation angle is difficult. When the release button has been pressed down half way ranging is performed based on image data of all pixels, and the ranging during LV flag is set to "0".

It should be noted that although all of rotation angles L, M and N have been determined with angle threshold Y as a threshold value in step S57, the angle threshold may be different for each rotation angle. For example, L and M may be determined with Y1 as a threshold value, and N may be determined with Y2 as a threshold value, where Y2>Y1. L and M may also use separate threshold values. Also, for the angle threshold X of step S53, similarly, different threshold values may be set for L, M and N. In this way, by determining swirl error by dividing in a direction orthogonal to the phase difference detection direction, appropriate determination and correction of swirl error becomes possible, even for a subject that has contrast patterns that are at an angle to parts of the subject image.

Once the respective settings have been carried out in steps S55, S59 and S61, the flow for LV swirl error determination is terminated and the originating flow is returned to.

As has been described above, with the one embodiment of the present invention, a pixel signal of focus detection pixels of the image sensor is subjected to thinned readout (refer, for example, to FIG. 3A, FIG. 3B, and S1-S11 in FIG. 6), focus offset amount and focus offset direction are detected by carrying out a focus detection operation by phase difference detection based on the pixel signal of the focus detection pixels that was subjected to thinned readout (refer, for example, to S11 in FIG. 6), swirl error arising in accordance with inclination of an optical image with respect to a direction that is orthogonal to the phase difference detection direction is determined based on the pixel signal of the focus detection pixels that was subjected to thinned readout (refer, for example, to S19 in FIG. 6), and it is determined whether or not to carry out an AF operation adopting a result of a focus detection operation (refer, for example, to S33 in FIG. 7) based on a determination result for swirl error, in accordance with an AF operation instruction (refer, for example, to S25 In FIG. 6). This means that even in a case where thinned read-out has been carried out for display of a live view image, ranging taking into consideration swirl error due to inclination of the subject image becomes possible by carrying out swirl error determination.

With the one embodiment of the present invention, pixel values have been created for virtual pixels by adding focus detection pixels for every one area that is constituted by pixel rows of the image sensor 21. The number of pixel rows of the image sensor 21 that are included in a single area corresponding to a virtual pixel may be a single pixel or plurality of pixels. Also, with the one embodiment of the present invention, at the time of swirl error detection, one virtual pixel column for at the time of ranging is divided into three virtual pixel columns, but this virtual pixel column may also be divided into four or more virtual pixel columns. Also, in the one embodiment of the present invention, the swirl error correction amount is calculated based on equation (1), but this is not limiting.

Further, with the one embodiment of the present invention, an apparatus for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc. The present invention may be applied as long as the apparatus is an apparatus for imaging, having an image sensor with focus detection pixels for phase difference detection arranged on a focusing surface.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus, having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprising:
  a readout section that thins and reads out a pixel signal of focus detection pixels of the image sensor,
  a focus detection section that detects an out of focus amount and an out of focus direction by carrying out a focus detection operation using phase difference detection based on the pixel signal of the focus detection pixels that has been thinned and read out,
  a swirl error determination section that determines swirl error arising in accordance with inclination of an optical image with respect to a direction that is orthogonal to a phase difference detection direction, based on the pixel signal of the focus detection pixels that has been thinned and read out,
  an AF operation instruction section that instructs an AF operation, and
  an AF control section that carries out an AF operation in accordance with an instruction of the AF operation instruction section,
  wherein the AF control section determines whether or not an AF operation will be carried out adopting output of the focus detection section based on output of the swirl error determination section, in accordance with an instruction for AF operation of the AF operation instruction section.

2. The imaging apparatus of claim 1, wherein:
  the AF control section, in a case where swirl error is small, based on output of the swirl error determination section, carries out AF operation based on output of the AF operation focus detection section in response to instruction of the AF operation instruction section.

3. The imaging apparatus of claim 2, wherein:
  the AF control section, in accordance with an instruction of the AF operation instruction section, carries out an operation to read out a pixel signal of the focus detection pixels using the readout section without thinning when it is determined that swirl error is large based on output of the swirl error determination section, and carries out a focus detection operation using the focus detection section based on a pixel signal of the focus detection pixels that has been read out.

4. The imaging apparatus of claim 1, further comprising:
a display for carrying out to display based on a pixel signal of imaging pixels that has been readout from the image sensor,
wherein the readout section performs thinned readout of a pixel signal of the focus detection pixels as well as thinned readout of a pixel signal of the imaging pixels, and the display performs display based on the pixel signal of the imaging pixels that has been subjected to thinned readout.

5. The imaging apparatus of claim 1, wherein:
the readout section has a plurality of thinning systems, and
the swirl error determination section changes a threshold value for determining swirl error based on a pixel signal of the focus detection pixels that has been read out, in accordance with the thinning system.

6. The imaging apparatus of claim 5, wherein:
the plurality of thinning systems have different thinning rates.

7. The imaging apparatus of claim 1, wherein:
the focus detection section corrects a focus detection result based on a determination result of the swirl error determination section.

8. An imaging method, for an imaging apparatus having an image sensor that is provided with a plurality of pixels having photoelectric conversion sections that convert an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, the imaging method comprising:
a readout step that thins and reads out a pixel signal of focus detection pixels of the image sensor,
a focus detection step that detects an out of focus amount and an out of focus direction by carrying out a focus detection operation using phase difference detection based on the pixel signal of the focus detection pixels that has been thinned and read out,
a swirl error determination step that determines swirl error arising in accordance with inclination of an optical image with respect to a direction that is orthogonal to a phase difference detection direction, based on the pixel signal of the focus detection pixels that has been thinned and read out, and
an AF operation determination step that determines whether or not to carry out AF operation adopting results of the focus detection operation based on determination result for the swirl error, in accordance with an AF operation instruction.

9. The imaging method of claim 8, wherein:
the AF operation determination step carries out AF operation based on output of the focus detection step, in the event that swirl error is determined to be small in the swirl error determination step.

10. The imaging method of claim 9, wherein:
the AF operation determination step, in the event that swirl error is determined to be large in the swirl error determination step, carries out a readout operation of an image signal for the focus detection pixels without thinning in the read out step, and carries out a focus detection operation in the focus detection step based on the pixel signal of the focus detection pixels that has been read out.

11. The imaging method of claim 8, wherein:
the imaging apparatus further comprises a display that carries out display based on a pixel signal of imaging pixels that has been read out from the image sensor,
and wherein the readout step performs thinned readout of a pixel signal of the focus detection pixels as well as thinned readout of a pixel signal of the imaging pixels, and the display performs display based on the pixel signal of the imaging pixels that has been subjected to thinned readout.

12. The imaging method of claim 8, wherein:
the readout step has a plurality of thinning systems, and
the swirl error determination step changes a threshold value for determining swirl error based on a pixel signal of the focus detection pixels that has been read out, in accordance with the thinning system.

13. The imaging method of claim 12, wherein:
the plurality of thinning systems have different thinning rates.

14. The imaging method of claim 8, wherein:
the focus detection step corrects a focus detection result based on a determination result of the swirl error determination step.

15. A non-transitory computer-readable medium storing a computer program for controlling an imaging apparatus, the imaging apparatus having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, the computer program comprising:
a readout step that thins and reads out a pixel signal of focus detection pixels of the image sensor,
a focus detection step that detects an out of focus amount and an out of focus direction by carrying out a focus detection operation using phase difference detection based on the pixel signal of the focus detection pixels that has been thinned and read out,
a swirl error determination step that determines swirl error arising in accordance with inclination of an optical image with respect to a direction that is orthogonal to a phase difference detection direction, based on the pixel signal of the focus detection pixels that has been thinned and read out, and
an AF operation determination step that determines whether or not to carry out AF operation adopting results of the focus detection operation based on determination result for the swirl error, in accordance with an AF operation instruction.

16. The non-transitory computer-readable medium of claim 15, wherein
the AF operation determination step carries out AF operation based on output of the focus detection step, in the event that swirl error is determined to be small in the swirl error determination step.

17. The non-transitory computer-readable medium of claim 16, wherein
the AF operation determination step, in the event that swirl error is determined to be large in the swirl error determination step, carries out a readout operation of an image signal for the focus detection pixels without thinning in the read out step, and carries out a focus detection operation in the focus detection step based on the pixel signal of the focus detection pixels that has been read out.

18. The non-transitory computer-readable medium of claim 15, wherein the imaging apparatus further comprises a display that carries out display based on a pixel signal of imaging pixels that has been read out from the image sensor, and wherein the readout step performs thinned readout of a pixel signal of the focus detection pixels as well as thinned readout of a pixel signal of the imaging pixels, and display of an image on the display is carried out based on the pixel signal of the imaging pixels that has been subjected to thinned readout.

19. The non-transitory computer-readable medium of claim 15, wherein the readout step has a plurality of thinning systems, and the swirl error determination step changes a threshold value for determining swirl error based on a pixel signal of the focus detection pixels that has been read out, in accordance with the thinning system.

20. The non-transitory computer-readable medium of claim 19, wherein the plurality of thinning systems have different thinning rates.

* * * * *